United States Patent
Faust et al.

(10) Patent No.: US 9,156,924 B2
(45) Date of Patent: *Oct. 13, 2015

(54) POLYMERIZATION INITIATING SYSTEM AND METHOD TO PRODUCE HIGHLY REACTIVE OLEFIN FUNCTIONAL POLYMERS

(71) Applicants: University of Massachusetts, Boston, MA (US); Infineum International Limited, Abingdon, Oxfordshire (GB)

(72) Inventors: Rudolf Faust, Lowell, MA (US); Jacob Emert, Linden, NJ (US)

(73) Assignees: University of Massachusetts, Boston, MA (US); Infineum International Limited, Abindon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/796,405

(22) Filed: Mar. 12, 2013

(65) Prior Publication Data

US 2014/0275453 A1 Sep. 18, 2014

(51) Int. Cl.
*C08F 4/26* (2006.01)
*C08F 110/10* (2006.01)

(52) U.S. Cl.
CPC .............. *C08F 4/26* (2013.01); *C08F 110/10* (2013.01)

(58) Field of Classification Search
None
See application file for complete search history.

(56) References Cited

U.S. PATENT DOCUMENTS

| | | | |
|---|---|---|---|
| 2,682,531 | A | 6/1954 | Ernst et al. |
| 3,850,897 | A | 11/1974 | Ferraris et al. |
| 5,254,649 | A | 10/1993 | Miln et al. |
| 5,408,018 | A | 4/1995 | Rath |
| 5,663,470 | A | 9/1997 | Chen et al. |
| 5,710,225 | A | 1/1998 | Johnson et al. |
| 6,211,312 | B1 | 4/2001 | Holtcamp |
| 6,346,585 | B1 | 2/2002 | Johnson et al. |
| 6,407,170 | B1 | 6/2002 | Johnson et al. |
| 6,407,186 | B1 | 6/2002 | Rath et al. |
| 6,441,110 | B1 | 8/2002 | Sigwart et al. |
| 6,562,913 | B1 | 5/2003 | Baxter, Jr. et al. |
| 6,683,138 | B2 | 1/2004 | Baxter, Jr. et al. |
| 6,753,389 | B1 | 6/2004 | Rath et al. |
| 6,846,903 | B2 | 1/2005 | Wettling et al. |
| 6,939,943 | B2 | 9/2005 | Wettling et al. |
| 7,038,008 | B2 | 5/2006 | Wettling et al. |
| 7,217,773 | B2 | 5/2007 | Rath et al. |

(Continued)

FOREIGN PATENT DOCUMENTS

CN  101955558 A1  1/2011
EP  0 436 775 A2  7/1991

(Continued)

OTHER PUBLICATIONS

Kennedy, et. al., "New Telechelic Polymers and Sequential Copolymers by Polyfunctional Initiator-Transfer Agents (Inifers)," Polymer Bulletin (1), pp. 575-580, 1979.

(Continued)

*Primary Examiner* — Ling Choi
*Assistant Examiner* — Catherine S Branch
(74) *Attorney, Agent, or Firm* — Hamilton, Brook, Smith & Reynolds, P.C.

(57) ABSTRACT

A method for producing highly reactive olefin polymers wherein at least 50 mol. % of the polymer chains have terminal double bonds, and a novel polymerization initiating system for accomplishing same.

32 Claims, 1 Drawing Sheet

(56) References Cited

U.S. PATENT DOCUMENTS

| | | | |
|---|---|---|---|
| 7,291,758 | B2 | 11/2007 | Bohnenpoll et al. |
| 7,683,194 | B2 | 3/2010 | Krossing et al. |
| 9,034,998 | B2 | 5/2015 | Faust et al. |
| 2004/0059076 | A1 | 3/2004 | Webb et al. |
| 2008/0293900 | A1 | 11/2008 | Hanefeld et al. |
| 2009/0318624 | A1 | 12/2009 | Storey et al. |
| 2011/0201772 | A1 | 8/2011 | Konig et al. |
| 2012/0165473 | A1 | 6/2012 | Koenig |
| 2013/0158217 | A1* | 6/2013 | Faust et al. .............. 526/192 |
| 2015/0105525 | A1 | 4/2015 | Faust et al. |

FOREIGN PATENT DOCUMENTS

| | | |
|---|---|---|
| EP | 0489508 A2 | 6/1992 |
| EP | 2 604 635 A1 | 6/2013 |
| WO | WO 94/19380 A1 | 9/1994 |
| WO | 99/07753 A1 | 2/1999 |
| WO | WO 2004/058828 A1 | 7/2004 |
| WO | WO 2006/074211 A1 | 7/2006 |
| WO | 2008/095933 A1 | 8/2008 |
| WO | WO 2009/120551 A1 | 10/2009 |
| WO | 2010/139684 A1 | 12/2010 |
| WO | 2011/054785 A1 | 5/2011 |
| WO | WO 2013/090764 A1 | 6/2013 |

OTHER PUBLICATIONS

Liu, et. al., "A cost-effective process for highly reactive polyisobutylenes via cationic polymerization coinitiated by AlCl3," Polymer (51), pp. 5960-5969, 2010.

Morgan, et. al., "Sulfonium Ion Adducts from Quasiliving Polyisobutylene and Mono- or Disulfides," Macromolecules (42), pp. 2344-2352, 2009.

Nielsen, et. al., "Synthesis of Isobutenyl-telechelic polyisobutylene by functionalization with isobutenyltrimethylsilane," Polymer (38), pp. 2529-2534, 1997.

Simison, et. al., "End-Quenching of Quasiliving Carbocationic Isobutylene Polymerization with Hindered Bases: Quantitative Formation of exo-Olefin-Terminated Polyisobutylene," Macromolecules (39), pp. 2481-2487, 2006.

Vasilenko, et. al., "Cationic Polymerization of Isobutylene Using AlCl3Bu2 as a Coinitiator: Synthesis of Highly Reactive Polyisobutylene," Macromolecules (43), pp. 5503-5507, 2010.

Final Office Action, U.S. Appl. No. 13/328,569, Date of Mailing: Jan. 3, 2014.

International Search Report and Written Opinion for Int'l Appl. No. PCT/US2012/069822, entitled: "Polymerization Initiating System and Method to Produce Highly Reactive Olefin Functional Polymers," Date of Mailing: Mar. 22, 2013.

European Search Report for European Application No. 11194680.2-1301, entitled: "Polymerization Initiating System and Method to Produce Highly Reactive Olefin Functional Polymers," Dated: Mar. 22, 2013.

Non-Final Office Action for U.S. Appl. No. 13/328,569; Date Mailed: Jan. 18, 2013.

Non-Final Office Action for U.S. Appl. No. 13/328,569; Date Mailed: Mar. 20, 2013.

International Preliminary Report on Patentability mailed on Jun. 26, 2014 for PCT/US2012/069822 for application entitled: "Polymerization Initiating System and Method to Produce Highly Reactive Olefin Functional Polymers,".

Office Action for U.S. Appl. No. 13/328,569 dated Jul. 9, 2014.

Shiman, D.I., et al., "Cationic Polymerization of Isobutylene by AlCl3/ether Complexes in Non-Polar Solvents: Effect of Ether Structure on the Selectivity of β-H Elimination," *Polymer*, 54:2235-2242, (2013).

European Search Report from EP 14 157 689.2, entitled Polymerization Initiating System and Method to Produce Highly Reactive Olefin Functional Polymers, Dated May 15, 2014.

Notice of Allowance for U.S. Appl. No. 13/328,569; Date Mailed: Jan. 30, 2015.

Non-Final Office Action for U.S. Appl. No. 14/052,490, dated Feb. 13, 2015.

* cited by examiner

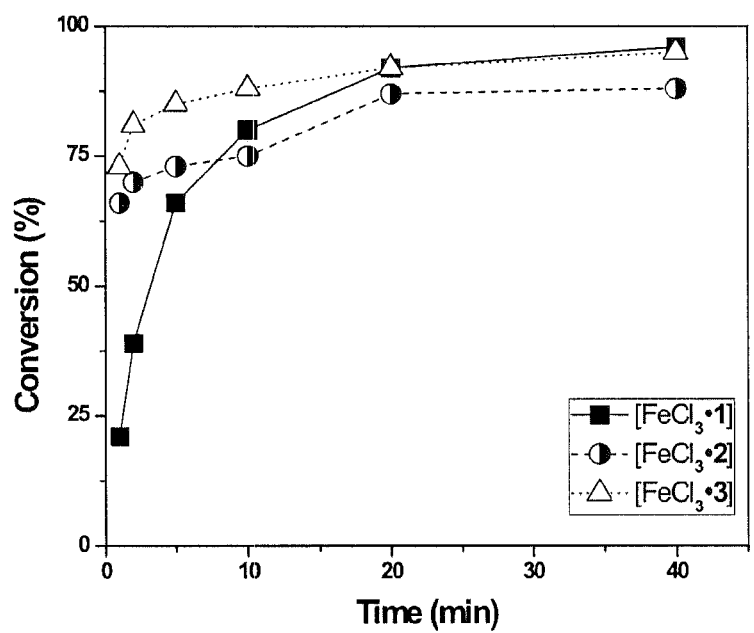

POLYMERIZATION INITIATING SYSTEM AND METHOD TO PRODUCE HIGHLY REACTIVE OLEFIN FUNCTIONAL POLYMERS

The invention is directed to a method for producing highly reactive olefin polymers wherein at least 50 mol. % of the polymer chains have terminal double bonds, and a novel polymerization initiating system for accomplishing same.

BACKGROUND OF THE INVENTION

The carbocationic polymerization of isobutylene (IB) is the subject of great scientific and industrial interest. The unique properties of polyisobutylene (PIB), a chemically stable fully saturated polymer make it a desirable material with applications ranging from medical devices to ashless (metal-free) dispersants/detergents suitable for use as motor oil and fuel additives. These ashless dispersants/detergents can be characterized as oil soluble surfactants with oligoamine end-groups derived from low molecular weight (number average molecular weight ($\overline{M}_n$) of from about 500 to about 5000) PIB or polybutenes (copolymers of IB with $C_4$ olefins) having olefinic end groups.

Two major industrial methods have been developed to produce low molecular weight IB homo or copolymers with olefinic end groups. The "conventional" method uses a $C_4$ mixture and an aluminum halide based catalyst system and produces polybutenes with high tri-substituted olefinic contents. Due to the low reactivity of the tri-substituted olefinic end groups, polybutenes need to be chlorinated to react with maleic anhydride to give polybutenylsuccinic anhydride, which is subsequently reacted with oligoalkylenimines to yield polybutenylsuccinimide-type ashless dispersant/detergent. The other method employs a pure IB feed stream and a $BF_3$ complex-based catalyst with either alcohols, or ethers in a polymerization reaction run at low temperature, which yields highly reactive PIB (HR PIB) with high exo-olefinic end-group contents. In contrast to the tri-substituted olefins of conventional polybutenes, PIB exo-olefins readily react with maleic anhydride in a thermal "ene" reaction to produce PIB succinic anhydride and subsequently polyisobutenylsuccinimide ashless dispersants. Because the final product does not contain chlorine, HR PIB is more desirable than conventional polybutenes. However, $BF_3$ is difficult to handle and the polymer may contain fluorine. Further, as noted above, this method requires a pure IB feed steam and low temperature (e.g., −30° C.) and therefore results in a more expensive product.

The above-described commercial process for producing HR PIB has been reported by U.S. Pat. No. 5,408,018 (and DE-A 2702604) to Rath. A range of process enhancements were subsequently reported in. U.S. Pat. Nos. 6,407,186, 6,753,389, and 7,217,773 to Rath et al. and U.S. Pat. Nos. 6,846,903, 6,939,943 and 7,038,008 to Wettling et al. A modified process using a different temperature regime and a low residence time was also previously described (e.g., U.S. Pat. Nos. 6,562,913 and 6,683,138 to Baxter et al.). All of these disclosures describe polymerizations carried out with $BF_3$ catalyst and an alcohol or ether co-catalyst. Such catalytic processes can leave residual fluorine in the polymer especially when utilized with the commonly available mixed $C_4$ Raffinate I stream. The presence of even small amounts of fluorine cause problems in downstream functionalization reactors due to the release of HF and therefore require expensive fluorine removal post-treatment.

Many attempts have therefore been made to find other methods for producing HR PIB. For instance PIB with nearly quantitative exo-olefin end groups has been obtained by reacting tert-chloride-terminated PIB (PIB-Cl) with strong bases such as potassium tert-butoxide and alkali ethoxides in refluxing tetrahydrofuran (THF) for 20-24 h, (Kennedy, J. P.; Chang, V. S. C.; Smith, R. A.; Iván, B. *Polym. Bull.* 1979, 1, 575); quenching living PIB with methallyltrimethylsilane, (Nielsen, L. V.; Nielson, R. R.; Gao, B.; Kops, J.; Iván, B. *Polymer* 1997, 38, 2528); quenching living PIB with a hindered base (e.g., 2,5-dimethylpyrrole or 1,2,2,6,6-pentamethylpiperidine), (Simison, K. L.; Stokes, C. D.; Harrison, J. J.; Storey, R. F. *Macromolecules* 2006, 39, 2481); quenching living PIB with an alkoxysilane or an ether compound (Storey, R. F.; Kemp, L. L. U.S. Patent Application Publication, 2009/0318624 A1, Dec. 24, 2009); and reacting living PIB with a mono-sulfide followed by decomposition of the resulting sulfonium salt with a base (Morgan. D. L.; Stokes, C. D.; Meierhoefer, M. A.; Storey, R. F. *Macromolecules* 2009, 42, 2344). However, all of the above methods are expensive as they involve living cationic polymerization at low temperature in a moderately polar solvent, and employ expensive reactants.

A broad disclosure of halogen-free metal catalysts based on oxides of Groups V and VI of the Periodic Table of Elements was described in U.S. Pat. No. 6,441,110 to Sigwart et al., but these catalysts were heterogeneous and gave poor monomer conversions, with only modest amounts of exo-olefins. Another catalyst system, based on metals from the $3^{rd}$ to the $12^{th}$ periods of the periodic system of elements with nitrile ligands and weakly coordinating anions was described in U.S. Pat. No. 7,291,758 to Bohnepoll et al. These catalysts were used only in a polar dichloromethane solution; not in an apolar, all-hydrocarbon media.

More recently it has been reported that $AlCl_3$-$OBu_2$ complexes in conjunction with a range of initiators or adventitious water initiate the polymerization of IB and in polar solvent ($CH_2Cl_2$/hexane 80/20 v/v) yield PIB with high exo-olefinic end groups up to 95% in a range of temperatures (−60 to −20° C.) (Vasilenko, I. V.; Frolov, A. N.; Kostjuk, S. V. *Macromolecules* 2010, 43(13), 5503-5507). Independently, similar results were reported with adventitious water as initiator in conjunction with $AlCl_3$ or $FeCl_3$ dialkyl ether complexes in $CH_2Cl_2$ at temperatures ranging from −20 to 20° C. (Lui, Q.; Wu Y.; Zhang, Y.; Yan. P. F.; Xu, R. W. *Polymers* 2010, 51, 5960-5969). However, due to the need for the polar solvent $CH_2Cl_2$ the commercial potential of this method is questionable. $AlCl_3$-$OBu_2$ has been reported to produce PIB with terminal vinylidene bonds in the absence of solvent and without added initiator, or with water as an added initiator (USPG 2011/0201772A1 of König et al.). However, none of the conventional cationic initiators such as alkyl halides, ethers, esters, alcohols and Brønsted acids were found to initiate directly the polymerization in apolar media with $AlCl_3$. Therefore there remains a need for a robust and economic method for the preparation of highly reactive PIB or polybutene in a non-polar hydrocarbon media.

It was previously found that conventional cationic initiators used in conjunction with certain combinations of Lewis acid/Lewis base complexes initiate the polymerization of IB in hydrocarbon solvents at temperatures of −30° C. to +50° C. and provide high yields of highly reactive PIB. More specifically, it was recognized that polymerization of IB in hydrocarbon solvents at temperatures of −30° C. to +50° C. could be initiated, and provide high yields of highly reactive PIB with a catalyst-initiator system comprising a Lewis acid catalyst (MR"$_m$Y$_n$) complexed to a Lewis base (B) in an apolar medium.

The affinity of the Lewis acid for the Lewis base was such that the Lewis acid can interact at least partially with a conventional cationic initiator (RX), enabling the formation of R$^+$, which initiated cationic polymerization of isobutylene. The initially complexed Lewis base was capable of effecting rapid deprotonation of the growing carbocation chain to form an exo-olefin prior to isomerization of the cationic chain or diffusion of the base into free solution. If the Lewis base did not complex to the Lewis acid, at least initially, deprotonation of the growing carbocation was not sufficiently rapid relative to isomerization to give the desired high yields of exo-olefin. If the interaction of the Lewis acid and the Lewis base was so strong that it prevented interaction with a conventional initiator, polymerization was be inefficient or did not occur at all. The Lewis acid or Lewis acid-Lewis base complex had to further be capable of interacting with a conventional initiator either in the presence or absence of adventitious water. Catalysts with which monomer conversion is substantially dependent on adventitious water, even in the presence conventional initiators, as evidenced by complete loss of conversion in the presence of a proton trap (e.g., 2,6-ditert-butylpyridine or "DTBP"), were not suitable. In the above systems, suitable Lewis bases were oxygen- and/or sulfur-containing nucleophiles, such as ethers, alcohols, ketones, aldehydes and esters, and sulfur-containing nucleophiles such as thioethers and thioketones.

Although the above polymerization system was found to provide excellent yields of highly reactive PIB, further study found that the yield could be further increased by proper selection the Lewis base and the control of the ratio of Lewis acid to Lewis base used to form the complex.

BRIEF DESCRIPTION OF THE FIGURES

FIG. 1 shows graphically the variation of conversion with time for the polymerization of IB initiated by t-BuCl[/FeCl$_3$.ether] systems in hexanes at 0° C.

DETAILED DESCRIPTION OF THE INVENTION

Lewis acid catalysts useful in the practice of the present invention can be represented by the general formula (MR"$_m$Y$_n$), wherein M is selected from Al, Fe, Ga, Hf, Zr and W; preferably Ga or Fe, more preferably Fe; R" is a hydrocarbyl group, preferably a C$_1$ to C$_8$ hydrocarbyl group, more preferably a C$_1$ to C$_8$ alkyl group; m is 0 or an integer of 1 to 5, preferably 0 or 1, more preferably 0; Y is halogen (F, Cl, Br), preferably either Cl or Br, more preferably Cl, and n is an integer of 1 to 6, preferably 3 to 5; with the proviso that m+n is equal to the valency of M. As used herein, the term "hydrocarbyl" means a chemical group of a compound that contains hydrogen and carbon atoms and that is bonded to the remainder of the compound directly via a carbon atom. The group may contain one or more atoms other than carbon and hydrogen ("hetero atoms"), provided they do not affect the essentially hydrocarbyl nature of the group.

The Lewis base (B) is dihydrocarbyl ether, wherein each hydrocarbyl group is independently selected from C$_1$ to C$_8$ hydrocarbyl. The hydrocarbyl groups of the above Lewis bases are preferably alkyl groups. The hydrocarbyl groups of the ether may be branched, straight chained or cyclic. Where the hydrocarbyl groups of the ether are branched or straight chained, the hydrocarbyl groups are preferably alkyl groups, more preferably C$_1$ to C$_4$ alkyl. One or each of the hydrocarbyl groups of the dihydrocarbyl ether Lewis base is substituted with an electron-withdrawing group, particularly a halogen atom, preferably chlorine.

An "initiator" is defined as a compound that can initiate polymerization, in the presence or absence of adventitious water and in the presence of a proton trap. The initiator of the present invention (RX) comprises a hydrocarbyl R group wherein the carbon linking group R to X is tertiary, benzylic or allylic, which hydrocarbyl group can form a stable carbocation (e.g., t-butyl$^+$), and an X group, which is a halogen.

The polymerization medium must be a substantially or completely apolar medium, such as a mixture of hexanes or saturated and unsaturated C$_4$ hydrocarbons.

In the polymerization process of the present invention, the feedstock may be pure isobutylene or a mixed C$_4$ hydrocarbyl feedstock containing isobutylene, such as a C$_4$ cut resulting from the thermal or catalytic cracking operation of, for example, naphtha. Thus, suitable feedstocks will typically contain at least 10%, and up to 100% isobutylene, by mass, based on the total mass of the feed. In addition to isobutylene, conventional C$_4$ cuts suitable for use as feedstocks that are of industrial importance typically will contain between about 5% and about 50% butene-1, between about 2% and about 40% butene-2, between about 2% and about 60% iso-butane, between about 2% and about 20% n-butane, and up to about 0.5% butadiene, all percentages being by mass, based on the total feed mass. Feedstocks containing isobutylene may also contain other non-C$_4$ polymerizable olefin monomers in minor amounts, e.g., typically less than 25%, preferably less than about 10%, and most preferably less than 5%, such as propadiene, propylene and C$_5$ olefins. The C$_4$ cut may be purified by conventional means to remove water, polar impurities and dienes.

The term "polybutene", as employed herein is intended to include not only homopolymers of isobutylene, but also copolymers of isobutylene and one or more other C$_4$ polymerizable monomers of conventional C$_4$ cuts as well as non-C$_4$ ethylenically unsaturated olefin monomers containing 5 carbon atoms, provided such copolymers contain typically at least 50 mass %, preferably at least 65 mass %, and most preferably at least 80 mass % isobutylene units, based on the polymer number average molecular weight ($\overline{M}_n$).

The Lewis acid and Lewis base can be complexed by, for example, dissolving the Lewis acid in a solvent (e.g., dichloromethane or 1,2-dichloroethane) to form a solution and then adding the Lewis base to the solution, while the solution is stirred. The complex may be added to the polymerization medium with the solvent; alternatively, the solvent may be removed prior to the addition of the complex to the polymerization medium.

The molar ratio of Lewis acid to Lewis base in the complex will typically be maintained within a range of from about 1:0.5 to about 1:2, preferably from about 1:0.7 to about 1:1.5, more preferably from about 1:0.9 to about 1:1.4, such as from about 1:1 to about 1:1.3.

The amount of the Lewis acid-Lewis base complex employed in the process of the present invention can be controlled, in conjunction with the concentration of initiator and monomer, reaction time and temperature, to achieve the target $\overline{M}_n$ of the polybutene polymer product, the conversion of butene and yield of polybutene. In view of the above, the Lewis acid-Lewis base complex is typically employed in an amount sufficient to contact the butene monomer in a liquid phase reaction mixture at a concentration of millimoles of Lewis acid-Lewis base complex per liter of reaction mixture of from about 1 mM to about 200 mM, preferably from about 5 mM to about 100 mM, and more preferably from about 10 mM to about 50 mM, such as from about 10 mM to about 30 mM.

The initiator will typically be employed in an amount sufficient to contact the butene monomer in a liquid phase reaction mixture at a concentration of millimoles of initiator per liter of medium, and independent from the amount of Lewis acid-Lewis base complex, of from about 1 mM to about 200 mM, preferably from about 5 mM to about 100 mM, and more preferably from about 10 mM to about 50 mM, such as from about 10 mM to about 30 mM.

The polymerization reaction can be conducted batch-wise, semi-continuously, or continuously. On an industrial scale, the polymerization reaction is preferably conducted continuously. Conventional reactors, such as tubular reactors, tube-bundle reactors or loop reactors, or tube or tube-bundle reactors with continuous circulation of the reaction material, may be used.

The polymerization reaction is conducted in the liquid phase to induce linear or chain-type polymerization, as opposed to ring or branch formation. Thus, if a feed is used that is gaseous under ambient temperature, it is preferred to control the reaction pressure and/or dissolve the feed in an inert solvent or liquid diluent, in order to maintain the feed in the liquid phase. Typical $C_4$ cuts comprising the feed are liquid under pressure and do not require a solvent or diluent. Typical diluents suitable for use with the process include $C_3$ to $C_6$ alkanes, such as propane, butane, pentane, isobutane and the like.

The Lewis acid-Lewis base complex is typically introduced into the reactor as a liquid partially or completely dissolved in a solvent, or as a solid. Polymerization is preferably conducted at a pressure sufficient to maintain the $C_4$ feed in a liquid state at the reaction temperature, or at higher pressures. The initiator may be introduced to the monomer feed or the reaction mixture in liquid form together with the Lewis acid-Lewis base complex or, preferably, is introduced to the monomer feed or the reaction mixture in liquid form by a line separate from the Lewis acid-Lewis base complex addition line.

The liquid phase reaction mixture temperature is controlled by conventional means to be typically from about $-30°$ C. to about $+50°$ C., preferably from about $-10°$ C. to about $+30°$ C., more preferably from $0°$ C. to about $+20°$ C., such as from $0°$ C. to about $+10°$ C.

The residence time of the butene to be polymerized may be from about 5 seconds to several hours, but will typically be from about 1 to about 300 minutes, such as 2 to about 120 minutes, preferably from about 5 to about 60 minutes.

In order to insure even distribution of the catalyst within the reactor, turbulent flow of the reactor contents can be generated by mixing, or with suitable baffles, such as baffle plates or oscillating baffles, or by dimensioning the reactor tube cross sections so that a suitable flow velocity is established.

The process of the present invention is typically conducted in a manner achieving an isobutylene conversion in the range of from about 20% up to about 100%, preferably from about 50% to about 100%, and more preferably from about 70% to about 100%. The combined use of temperature control and catalyst feed rate permits formation of polybutenes having a $\overline{M}_n$ of from about 400 Daltons to about 4000 Daltons, preferably from about 700 Daltons to about 3000 Daltons, more preferably from about 1000 Daltons to about 2500 Daltons; a molecular weight distribution (MWD) of typically from about 1.1 to about 4.0, preferably from about 1.5 to about 3.0, an exo-olefin content of greater than 50 mol. %, preferably greater than 60 mol. %, more preferably greater than 70 mol. %, such as from about 80 mol. % to about 95 mol. %; a tetrasubstituted olefin content of less than about 20 mol. %, such as less than about 15 mol. %, preferably less than about 10 mol. %, more preferably less than about 5 mol. %; and a chlorine content of less than about 10 mol. %, such as less than about 5 mol. %, preferably less than about 2 mol. %, more preferably less than about 1 mol. %, based on the total moles of polymer.

Once the target molecular weight of the polymer is achieved, the polymer product can be discharged from the reactor and passed into a medium that deactivates the polymerization catalyst and terminates the polymerization. Suitable deactivation media include water, amines, alcohols and caustics. The polyisobutylene product can then be separated by distilling off the remaining $C_4$ hydrocarbons and low molecular weight oligomers. Preferably residual amounts of catalyst are removed, usually by washing with water or caustic.

This invention will be further understood by reference to the following examples, which are not intended, and should not be construed as listing all possible embodiments within the scope of the invention.

Examples

Polymerization

Polymerizations were carried out under a dry nitrogen atmosphere in an MBraun 150-M glove box (Innovative Technology Inc., Newburyport, Mass.) Isobutene (IB) was condensed and distributed to the polymerization reactors, screw top culture tubes (75 ml) at $-30°$ C. Polymerizations were conducted in hexanes co-initiated with the appropriate $FeCl_3$ concentration with a monomer concentration of 1M, at $0°$ C. After a predetermined time, polymerization was terminated by addition of 0.2 mL methanol. The polymer was recovered and purified by re-precipitation from $NH_4OH$ solution. Conversions were determined by gravimetric analysis.

Preparation of Lewis Acid (LA/Ether Complexes)

$FeCl_3$.dialkyl ether complexes were prepared at room temperature just before the polymerization of IB. In a glovebox DCM was added to $FeCl_3$, which had been previously weighed and sealed in a 20 mL screw-cap vial with a Teflon seal. Next, an equimolar amount of the appropriate ether was added drop-wise via a syringe to the sealed vial containing the Lewis acid while stirring to form a 1.0 M Lewis acid/ether complex solution.

Characterization

Number average molecular weight ($\overline{M}_n$) and polydispersities (PDI) of the polymers were obtained from size exclusion chromatography with universal calibration using a Waters 717 Plus autosampler, a 515 HPLC pump, a 2410 differential refractometer, a 2487 UV-VIS detector, a MiniDawn multi angle laser light scattering (MALLS) detector (measurement angles of 44.7°, 90.0°, and 135.4°) from Wyatt Technology Inc, ViscoStar viscosity detector from Wyatt Technology Inc., and five Ultrastyragel GPC columns connected in the following order: 500, $10^3$, $10^4$, $10^5$ and 100 Å. Refractive index (RI) was the concentration detector. Tetrahydrofuran was used as the eluent at a flow rate of 1.0 ml/min at room temperature. The results were processed by Astra 5.4 software from Wyatt Technology Inc.

Nuclear Magnetic Resonance

Proton nuclear magnetic resonance ($^1H$ NMR) spectra were recorded on a Bruker 500 MHz spectrometer using $CDCl^3$ as solvent (Cambridge Isotope Laboratory, Inc.). The polyisobutene (PIB) end group content was determined by $^1H$ NMR as previously reported (see Kumar, R.; Dimitrov, P.; Bartelson, K. J.; Faust, R., *Macromolecules* 2012, 45, 8598-8603).

Results

While not wishing to be bound by any specific theory, it is suggested that one possible polymerization scheme for the polymerization of IB with $FeCl_3$ is as shown below:

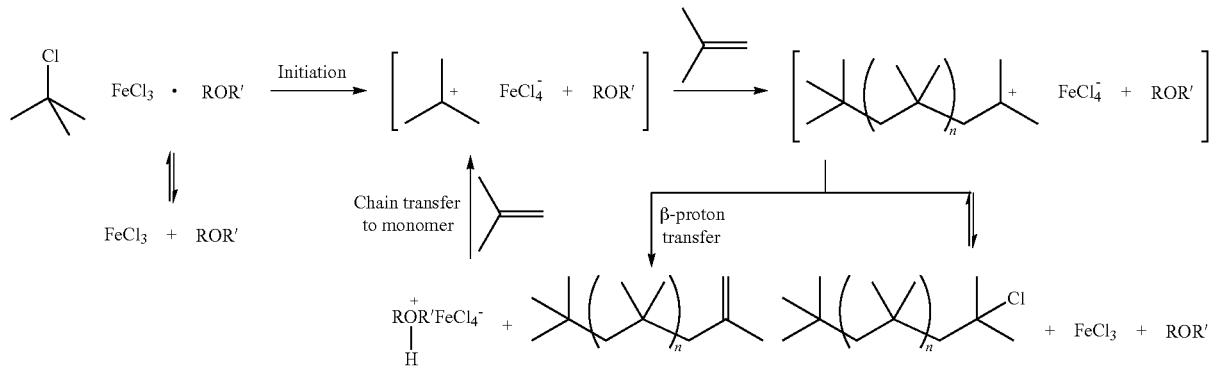

Since steric and electronic effects impact the rate of ionization and chain transfer (β-proton abstraction followed by proton transfer to IB), polymerization rate, molecular weight and exo-olefin are all affected by the selection of the R and R' groups of ROR'. Further, steric and electronic effects may also affect the equilibrium constant of the Lewis acid with the ether.

Complex formation between $FeCL_3$ and the ethers shown below was studied in 1.0 M $CH_2Cl_2$ solutions at room temperature using ATR FT-IR spectroscopy. Previous studies of the complex formation of $FeCl_3$ and diisopropyl ether (ether 1) by ATR FT-IR indicated that only a 1:1 complex is formed, as evidenced by the presence of free ether when excess amounts of ether are added relative to $FeCl_3$ (see Liu, Q.; Wu, Y.; Yan, P.; Zhang, Y; Xu, R., *Macromolecules* 2011, 44, 1866-1875; see also Kumar, R.; Dimitrov, P.; Bartelson, K. J.; Emert, J.; Faust, R., *Macromolecules* 2012, 45, 8598-8603).

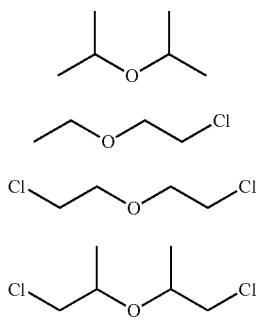

Consistent with the previously reported results discussed supra, the 1:1 complex of $FeCl_3$ with diisopropyl ether (ether 1) did not show any un-dissolved $FeCl_3$, which is indicative of complete complexation. The 1:1 complex of $FeCl_3$ and (2-chloroethyl) ethyl ether (ether 2) did not show un-dissolved $FeCl_3$, while the corresponding complex of $FeCl_3$ and bis-(2-chloroethyl)ether (ether 3) did. Upon increasing the ratio of $FeCl_3$:ether 3 to 1:1.13, un-dissolved $FeCl_3$ could no longer be visually detected in the complex solution. The 1:1 complex of $FeCl_3$.ether 4 showed some un-dissolved $FeCl_3$ and was similar in appearance to the 1:1 complex of $FeCl_3$ and ether 3. The shifting of the ether IR signature to lower wavelengths is consistent with a complexation event; complexation causes the lengthening of the C—O bond of the ether, which causes the observed wavelength shift.

The above observations can all be interpreted in terms of different complexation equilibria with different ethers. Complexes that do not show un-dissolved $FeCl_3$ at 1:1 $FeCl_3$ to ether oxygen stoichiometry i.e., ethers 1 and 2, clearly have an equilibrium constant that favors complexation. Conversely, complexes that do show un-dissolved $FeCl_3$; complexes with ethers 3 and 4 have lower complex equilibrium constants. In the cases of ethers 4 and 4, the lower equilibrium constant of complexation can be attributed to electronic effects, as the presence of the two electron withdrawing chlorine atoms significantly decreases the electron density of the ether oxygen.

Solubility studies were conducted on the ethers 1, 2, 3 and 4 using a simple centrifuge experiment simulating polymerization conditions. A complex was prepared as a 1.0 M solution in dichloromethane (DCM) in a 30 mL centrifuge tube. The centrifuge was then set to the appropriate temperature (0° C.) and an appropriate amount of hexane was added to the centrifuge tube such that the complex concentration was 0.2 M. The centrifuge tube was allowed to equilibrate to the appropriate temperature in the centrifuge before it was spun at 3750 rpm for 10 minutes. Upon completion, an aliquot of the centrifuged solution was transferred to a round bottom flask, the solvent and excess ether (if any still remained) was removed, and the residue was weighed. From this data, the amount of complex dissolved in the entire solution was calculated (see Table 1).

TABLE 1

Solubility data for $FeCl_3$•ether complexes (prepared in freshly distilled DCM) at 0.020M in hexanes at 0° C.

| Entry # | Ether | $FeCl_3$:Ether | Extent of Complexation (%)[a] | Soluble Complex Concentration[b] |
|---|---|---|---|---|
| 1 | 1 | 1:1 | 100 | 0.0118M |
| 2 | 2 | 1:1 | 100 | 0.0091M |
| 3 | 3 | 1:1 | 64 | 0.0063M |
| 4 | 4 | 1:1 | Not Determined | 0.00044M |

[a]Based on ATR FT-IR studies in DCM.
[b]Based on solubility studies in hexanes

The 1:1 complexes of $FeCl_3$ with chlorinated ethers 2 and 3 showed decreased solubility compared to ether 1. The lower concentration of 1:1 $FeCl_3$.ether 3 complex can also be attributed to incomplete complex formation due to the reduced electron density on the oxygen of this particular ether. This phenomenon was more pronounced in the case of the 1:1 $FeCl_3$.ether 4 complex, with which the concentration of the complex in the reaction system was only 0.00044 M.

The above solubility data were then correlated with the results from polymerizations using the various complexes (Table 2).

TABLE 2

Polymerization of IB in hexanes at 0° C. for 20 minutes initiated by t-BuCl and coinitiated by FeCl₃•ether complexes (prepared in freshly distilled DCM). (IB) = 1.0M, (t-BuCl) = 0.02M and (FeCl₃•ether) = 0.02M. Quenched with MeOH

| Entry # | Complex | FeCl₃:Ether | Conv.$^c$ (%) | $\overline{M}_n$ NMR g/mol | $\overline{M}_n$ GPC g/mol | PDI | Exo$^d$ (%) | Endo + Tri$^d$ (%) | Tetra$^d$ (%) | PIB-Cl$^d$ (%) | Coupled$^d$ (%) | [PIB]$^e$ |
|---|---|---|---|---|---|---|---|---|---|---|---|---|
| 5$^f$ | FeCl₃•1 | 1:1 | 81 | 900 | 1100 | 2.8 | 78 | 9 | 6 | 6 | 1 | 0.053 |
| 6$^f$ | FeCl₃•2 | 1:1 | 87 | 400 | 600 | 3.0 | 68 | 9 | 8 | 0 | 15 | 0.139 |
| 7$^f$ | FeCl₃•3 | 1:1 | 93 | 500 | 800 | 2.8 | 62 | 16 | 17 | 1 | 5 | 0.106 |
| 8 | FeCl₃•4 | 1:1 | 85 | 400 | 700 | 2.3 | 54 | 22 | 23 | 0 | 2 | 0.118 |

$^c$Gravimetric conversion.
$^d$Determined by $^1$H NMR spectroscopy.
$^e$[PIB] = [IB] × 56.11 × (conv./$\overline{M}_{n,NMR}$).
$^f$All values averaged from multiple runs.

When the polymerization was coinitiated with FeCl₃ complexes prepared with ether 2 or 3, which possess an electron withdrawing chlorine atom(s), increased conversion (>60%), but slightly lower exo-olefin content (≈60%) was obtained, as compared to those obtained with FeCl₃.ether 1 (entries 6 and 7 vs. entry 5). The higher conversion was obtained despite the lower soluble complex concentration when using ethers 2 and 2 in solution as compared to ether 1. Similarly, the 1:1 complex of FeCl₃.ether 4 provided higher monomer conversion (but with lower exo-olefin content), even though the concentration of soluble complex was extremely low (entry 8). These results contrast with the absence of polymerization reported previously with diethyl ether (see Kumar, R.; Dimitrov, P.; Bartelson, K. J.; Emert, J.; Faust, R., *Macromolecules* 2012, 45, 8598-8603).

The effect of the stoichiometry of FeCl₃/ether stoichiometry and FeCl₃.ether complex concentration are shown in Tables 3 and 4, respectively.

TABLE 3

Effect of FeCl₃:ether ratio on polymerization of IB in hexanes at 0° C. initiated by t-BuCl and coinitiated by FeCl₃•ether complexes (prepared in freshly distilled DCM). (IB) = 1.0M, (t-BuCl) = 0.02M and (FeCl₃•ether) = 0.02M. Quenched with MeOH

| Entry # | Complex/ Ratio | Time (min) | Conv.$^c$ (%) | $\overline{M}_n$ NMR g/mol | $\overline{M}_n$ GPC g/mol | PDI | Exo$^d$ (%) | Endo + Tri$^d$ (%) | Tetra$^d$ (%) | PIB-Cl$^d$ (%) | Coupled$^d$ (%) | [PIB]$^e$ |
|---|---|---|---|---|---|---|---|---|---|---|---|---|
| 9 | FeCl₃•1 1:0.95 | 20 | 99 | 900 | 1000 | 3.1 | 72 | 13 | 13 | 0 | 3 | 0.062 |
| 10$^f$ | FeCl₃•1 1:1 | 20 | 81 | 900 | 1100 | 2.8 | 78 | 9 | 6 | 6 | 1 | 0.053 |
| 11 | FeCl₃•1 1:1.05 | 20 | 42 | 900 | 1300 | 3.2 | 67 | 11 | 13 | 9 | 1 | 0.026 |
| 12 | FeCl₃•2 1:0.95 | 20 | 87 | 300 | 500 | 3.3 | 68 | 9 | 8 | 0 | 15 | 0.151 |
| 13$^f$ | FeCl₃•2 1:1 | 20 | 87 | 400 | 600 | 3.0 | 68 | 9 | 8 | 0 | 15 | 0.139 |
| 14 | FeCl₃•2 1:1.05 | 20 | 85 | 300 | 600 | 2.9 | 65 | 9 | 9 | 0 | 17 | 0.149 |
| 15$^g$ | FeCl₃•3 1:1 | 20 | 93 | 500 | 800 | 2.8 | 62 | 16 | 17 | 1 | 5 | 0.106 |
| 16 | FeCl₃•3 1:1.1 | 10 | 92 | 500 | 700 | 2.8 | 64 | 15 | 15 | 2 | 4 | 0.099 |
| 17 | FeCl₃•3 1:1.1 | 20 | 93 | 400 | 800 | 2.7 | 60 | 17 | 18 | 0 | 5 | 0.123 |
| 18 | FeCl₃•3 1:1.2 | 10 | 95 | 400 | 500 | 2.2 | 71 | 13 | 12 | 0 | 4 | 0.146 |
| 19 | FeCl₃•3 1:1.2 | 20 | 96 | 400 | 700 | 2.8 | 60 | 16 | 18 | 0 | 5 | 0.130 |
| 20$^f$ | FeCl₃•3 1:1.3 | 20 | 92 | 400 | 700 | 2.9 | 58 | 17 | 18 | 1 | 7 | 0.129 |
| 21 | FeCl₃•3 1:1.4 | 20 | 91 | 400 | 600 | 3.0 | 62 | 15 | 17 | 0 | 6 | 0.132 |

$^c$Gravimetric conversion.
$^d$Determined by $^1$H NMR spectroscopy.
$^e$[PIB] = [IB] × 56.11 × (conv./$\overline{M}_{n,NMR}$).
$^f$All values averaged from multiple runs.

The polymerization conversion was found to decrease in the presence of excess ether 1 (entry 11), but remain essentially unchanged in the presence of excess $FeCl_3$ (entry 9). In contrast, with both $FeCl_3$.ether 2 and $FeCl_3$.ether 3 complexes, there was no significant change in conversion or exo-olefin content in the studied range of $FeCl_3$:ether ratios. (entries 12 through 21). This can be attributed to the presence of the electron withdrawing chlorine atoms on ethers 2 and 3.

TABLE 4

Effect of complex concentration of IB in hexanes at 0° C. initiated by t-BuCl and coinitiated by $FeCl_3$•ether complexes (prepared in freshly distilled DCM). (IB) = 1.0M, (t-BuCl) = 0.02M and ($FeCl_3$•ether) = 0.02, 0.015 or 0.010M. Quenched with MeOH

| Entry # | Complex/ Ratio | Complex (M)/ Time (min) | Conv.[c] (%) | $\overline{M}_n$ NMR g/mol | $\overline{M}_n$ GPC g/mol | PDI | Exo[d] (%) | Endo + Tri[d] (%) | Tetra[d] (%) | PIB-Cl[d] (%) | Coupled[d] (%) | [PIB][e] |
|---|---|---|---|---|---|---|---|---|---|---|---|---|
| 22 | $FeCl_3$•2 1:1 | 0.02/ 10 | 85 | 400 | 400 | 2.9 | 72 | 8 | 8 | 0 | 12 | 0.118 |
| 23[f] | $FeCl_3$•2 1:1 | 0.02/ 20 | 87 | 400 | 600 | 3.0 | 68 | 9 | 8 | 0 | 15 | 0.139 |
| 24 | $FeCl_3$•2 1:1 | 0.015/ 10 | 79 | 600 | 800 | 2.9 | 75 | 9 | 8 | 1 | 6 | 0.076 |
| 25 | $FeCl_3$•2 1:1 | 0.015/ 20 | 80 | 400 | 800 | 3.0 | 73 | 9 | 8 | 0 | 10 | 0.105 |
| 26 | $FeCl_3$•2 1:1 | 0.01/ 10 | 75 | 500 | 800 | 2.9 | 71 | 9 | 10 | 1 | 8 | 0.080 |
| 27 | $FeCl_3$•2 1:1 | 0.01/ 20 | 78 | 500 | 800 | 3.3 | 73 | 8 | 9 | 0 | 10 | 0.091 |
| 28 | $FeCl_3$•3 1:1 | 0.02/ 10 | 92 | 600 | 700 | 2.8 | 64 | 15 | 16 | 2 | 3 | 0.092 |
| 29[f] | $FeCl_3$•3 1:1 | 0.02/ 20 | 93 | 500 | 800 | 2.8 | 62 | 16 | 17 | 1 | 5 | 0.106 |
| 30[f] | $FeCl_3$•3 1:1.3 | 0.02/ 10 | 92 | 400 | 700 | 2.9 | 58 | 17 | 18 | 1 | 7 | 0.129 |
| 31 | $FeCl_3$•3 1:1.3 | 0.02/ 20 | 90 | 600 | 900 | 3.8 | 61 | 14 | 18 | 2 | 5 | 0.088 |

[c]Gravimetric conversion.
[d]Determined by $^1$H NMR spectroscopy.
[e][PIB] = [IB] × 56.11 × (conv./$\overline{M}_{n,NMR}$).
[f]All values averaged from multiple runs.

Decreasing the concentration of the complex did not have a significant effect on the outcome of the polymerization, although a slight decrease in conversion and slight increase in exo-olefin content was observed (entries 22 to 27). These results attest to the robustness of the catalyst/initiation system.

A comparison of the kinetics of IB polymerization initiated by t-BuCl/$FeCl_3$.ether in hexanes at 0° C. is shown, in graphical form, in FIG. 1. Saturation conversions were obtained after 20 minutes for all three $FeCl_3$.ether systems and the exo-olefin content remained fairly constant throughout the polymerizations.

The impact of the proton trap 2,6-ditert.-butylpyridine (DTBP) on the polymerization of IB initiated by 2-chloro-2,4,4-trimethylpentane (TMPCl) or t-BuCl and coinitiated by $FeCl_3$.ether complexes is shown in Table 5.

TABLE 5

Polymerization of IB in hexanes at 0° C. for 20 minutes initiated by either TMPCl or t-BuCl and coinitiated by $FeCl_3$•ether complexes (prepared in freshly distilled DCM). (IB) = 1.0M, Initiator = 0.02M, DTBP = 0.005M and ($FeCl_3$•ether) = 0.02M. Quenched with MeOH

| Entry # | Complex/ Ratio | Init. (M) | DTBP (M) | Conv.[c] (%) | $\overline{M}_n$ NMR g/mol | $\overline{M}_n$ GPC g/mol | PDI | Exo[d] (%) | Endo + Tri[d] (%) | Tetra[d] (%) | PIB-Cl[d] (%) | Coupled[d] (%) | [PIB][e] |
|---|---|---|---|---|---|---|---|---|---|---|---|---|---|
| 32 | $FeCl_3$•2 1:1 | — | 0 | 56 | 500 | 600 | 3.2 | 72 | 10 | 6 | 0 | 11 | 0.069 |
| 33 | $FeCl_3$•2 1:1 | — | 0.005 | 5 | 300 | 600 | 2.5 | 70 | 9 | 4 | 0 | 17 | 0.022 |

TABLE 5-continued

Polymerization of IB in hexanes at 0° C. for 20 minutes initiated by either
TMPCl or t-BuCl and coinitiated by FeCl₃•ether complexes (prepared in freshly distilled
DCM). (IB) = 1.0M, Initiator = 0.02M, DTBP = 0.005M and (FeCl₃•ether) = 0.02M.
Quenched with MeOH

| Entry # | Complex/ Ratio | Init. (M) | DTBP (M) | Conv.$^c$ (%) | $\overline{M}_n$ NMR g/mol | $\overline{M}_n$ GPC g/mol | PDI | Exo$^d$ (%) | Endo + Tri$^d$ (%) | Tetra$^d$ (%) | PIB-Cl$^d$ (%) | Coupled$^d$ (%) | [PIB]$^e$ |
|---|---|---|---|---|---|---|---|---|---|---|---|---|---|
| 34 | FeCl₃•2 1:1 | — | 0.010 | 0 | — | — | — | — | — | — | — | — | — |
| 35 | FeCl₃•2 1:1 | t-BuCl 0.02 | 0.005 | 43 | 300 | 400 | 2.3 | 65 | 8 | 7 | 0 | 20 | 0.100 |
| 36$^f$ | FeCl₃•2 1:1 | t-BuCl 0.02 | 0 | 87 | 400 | 600 | 3.0 | 68 | 9 | 8 | 0 | 15 | 0.139 |
| 37 | FeCl₃•3 1:1.35 | — | 0 | 86 | 400 | 500 | 3.1 | 69 | 15 | 13 | 0 | 3 | 0.114 |
| 38 | FeCl₃•3 1:1.35 | — | 0.005 | 36 | 500 | 600 | 3.4 | 70 | 12 | 12 | 0 | 6 | 0.039 |
| 39 | FeCl₃•3 1:1.35 | — | 0.010 | 24 | 800 | 700 | 3.9 | 71 | 12 | 13 | 0 | 4 | 0.016 |
| 40 | FeCl₃•3 1:1.35 | t-BuCl 0.02 | 0.005 | 68 | 500 | 600 | 4.0 | 65 | 11 | 12 | 6 | 5 | 0.074 |
| 41 | FeCl₃•3 1:1.35 | t-BuCl 0.02 | 0 | 96 | 400 | 600 | 3.3 | 61 | 16 | 17 | 2 | 3 | 0.142 |
| 42 | FeCl₃•2 1:1 | TMPCl 0.02 | 0.005 | 47 | 300 | 700 | 1.7 | 72 | 8 | 7 | 0 | 14 | 0.113 |
| 43 | FeCl₃•2 1:1 | TMPCl 0.02 | 0 | 83 | 300 | 600 | 2.8 | 68 | 9 | 8 | 0 | 15 | 0.134 |
| 44 | FeCl₃•3 1:1.35 | TMPCl 0.02 | 0.005 | 76 | 500 | 600 | 2.5 | 69 | 13 | 13 | 3 | 3 | 0.091 |
| 45 | FeCl₃•3 1:1.35 | TMPCl 0.02 | 0 | 95 | 400 | 400 | 2.6 | 62 | 13 | 16 | 2 | 3 | 0.138 |

$^c$Gravimetric conversion.
$^d$Determined by $^1$H NMR spectroscopy.
$^e$[PIB] = [IB] × 56.11 × (conv./M$_{n,NMR}$).
$^f$All values averaged from multiple runs.

It was previously found that in the absence of initiator and DTBP, the use of the FeCl₃.ether 1 system resulted in ≈29% IB conversion (see Kumar, R.; Dimitrov, P.; Bartelson, K. J.; Emert, J.; Faust, R., *Macromolecules* 2012, 45, 8598-8603). In contrast, in the absence of initiator and DTBP, the use of the 1:1 FeCl₃.ether 2 complex and the 1:1.35 FeCl₃.ether 3 complex resulted in 56% and 86% conversion, respectively (entries 32 and 37). The substantially higher rates of polymerization for both ethers 2 and 3, compared to ether 1, and the higher rate of polymerization for ether 3 compared to ether 2 can be explained by the fact that the nucleophilicity of these ethers increases in the order ether 3<ether 2<ether 1. Thus, the ether is more easily displaced from the complex in the case of ether 3, which allows for the faster ionization of t-BuCl.

In the presence of DTBP at 0.005 M, 5% and 36% conversion was reached at 20 minutes (entries 33 and 38). At 0.01M DTBP, polymerization was absent in the case of ether 2, however 24% conversion was still obtained with ether 3 (entries 34 and 39). It is noted that the ether moiety was not observed in the $^1$H NMR spectrum of the product, and thus, ether 3 is not an initiator.

The molecular weights were generally high with ether 3 as opposed to ether 2 due to the fact that ether 3 is less basic than ether 2 and thus, there is a decrease in proton abstraction from the growing chain end, which consequentially leads to a polymer with a higher molecular weight. The addition of t-BuCl increases conversion and, furthermore, PIB with an exo-olefin content of ≈60 to 70% was obtained (entries 35 and 40). Conversions, molecular weights and exo-olefin contents were similar for both t-BuCl and TMPCl (entry 35 vs. 42 and entry 40 vs. 44).

While certain representative embodiments and details have been provided to illustrate the invention, it will be apparent to the skilled artisan that various product and process changes from those disclosed herein may be made without departing from the scope of the present invention. The appended claims define the scope of the invention All cited patents, test procedures, priority documents, and other cited documents are fully incorporated by reference to the extent that such material is consistent with this specification and for all jurisdictions in which such incorporation by reference is permitted.

Certain features of the present invention are described in terms of a set of numerical upper limits and a set of numerical lower limits. This specification discloses all ranges formed by any combination of these limits. It is to be understood that the upper limits and lower limits, as well as range and ratio limits set forth herein may be independently combined, and that all combinations of these limits are within the scope of the invention unless otherwise indicated.

What is claimed is:

1. A process for the preparation of polybutene having an exo-olefin content of at least 50 mol. %, which process comprises contacting isobutene or an isobutene-containing monomer mixture, with a Lewis acid catalyst complexed with an oxygen and/or sulfur-containing Lewis base, in a substantially or completely apolar solvent, and initiating polymerization of said isobutene or an isobutene-containing monomer mixture with an initiator, wherein said Lewis acid catalyst is a Lewis acid of the formula MR"mYn, wherein M is a metal selected from Al, Fe, Ga, Hf, Zr and W; R" is a hydrocarbyl group; Y is halogen; m is 0 or an integer of 1 to 5; and n is an integer of 1 to 6, with the proviso that m+n is equal to the valency of metal M; said Lewis base is dihydrocarbyl ether, wherein each ether hydrocarbyl group is independently selected from C1 to C8 hydrocarbyl, wherein one or each of said ether hydrocarbyl groups are substituted, on a carbon atom other than the carbon atom adjacent to the oxygen atom of the ether group, with an electron-withdrawing group; the initiator is a compound of the formula RX, wherein X is a halide; R is a hydrocarbyl group capable of forming a stable carbocation, and wherein the carbon linking group R to group X is tertiary, benzylic or allylic.

2. The process of claim 1, wherein M is Ga or Fe, and R" is a C1 to C8 alkyl group.

3. The process of claim 1, wherein m is 0 or 1.

4. The process of claim 1, wherein Y is Cl or Br.

5. The process of claim 1, wherein said ether hydrocarbyl groups are alkyl groups.

6. The process of claim 5, wherein said ether hydrocarbyl groups are C1 to C4 alkyl groups.

7. The process of claim 1, wherein said electron-withdrawing group is a halogen atom.

8. The process of claim 7, wherein said electron-withdrawing group is a chlorine atom.

9. The process of claim 5, wherein said electron-withdrawing group is a halogen atom.

10. The process of claim 9, wherein said electron-withdrawing group is a chlorine atom.

11. The process of claim 1, wherein said isobutene or an isobutene-containing monomer mixture is selected from pure isobutene; a C4 refinery cut containing between about 5% and about 50% butene-1, between about 2% and about 40% butene-2, between about 2% and about 60% iso-butane, between about 2% and about 20% n-butane, and up to about 0.5% butadiene, wherein all percentages are by mass, based on the total mass of the C4 refinery cut; and mixtures of pure isobutene and said C4 refinery cut.

12. The process of claim 1, wherein said complex is contacted with said isobutene or an isobutene-containing monomer at a concentration of millimoles of Lewis acid-Lewis base complex per liter of medium of from about 1 mM to about 200 mM.

13. The process of claim 1, wherein said Lewis acid and said Lewis base are complexed by dissolving the Lewis acid in solvent to form a solution, and then adding said Lewis base to said solution.

14. The process of claim 1, wherein the polymerization process is conducted continuously.

15. The process of claim 1, wherein said polybutene product has an exo-olefin content of at least 70 mol. %.

16. A catalyst-initiator system for catalyzing the polymerization of isobutene or an isobutene-containing monomer mixture in a substantially or completely apolar solvent to provide a polybutene product having an exo-olefin content of at least 50 mol. %, wherein said catalyst comprising a Lewis acid catalyst complexed with a Lewis base, wherein said Lewis acid catalyst is a Lewis acid of the formula MR"mYn, wherein M is a metal selected from Al, Fe, Ga, Hf, Zr and W; R" is a hydrocarbyl group; Y is halogen; m is 0 or an integer of 1 to 5; and n is an integer of 1 to 6, with the proviso that m+n is equal to the valency of metal M; said Lewis base is dihydrocarbyl ether, wherein each ether hydrocarbyl group is independently selected from C1 to C8 hydrocarbyl, wherein one or each of said ether hydrocarbyl groups are substituted, on a carbon atom other than the carbon atom adjacent to the oxygen atom of the ether group, with an electron-withdrawing group; and the polymerization is initiated via an initiator of the formula RX, wherein X is a halide; R is a hydrocarbyl group capable of forming a stable carbocation, and wherein the carbon linking group R to group X is tertiary, benzylic or allylic.

17. The catalyst-initiator system of claim 16, wherein M is Ga or Fe, and R" is a C1 to C8 alkyl group.

18. The catalyst-initiator system of claim 16, wherein m is 0 or 1.

19. The catalyst-initiator system of claim 16, wherein Y is Cl or Br.

20. The catalyst-initiator system of claim 16, wherein said ether hydrocarbyl groups are alkyl groups.

21. The catalyst-initiator system of claim 20, wherein said ether hydrocarbyl groups are C1 to C4 alkyl groups.

22. The catalyst-initiator system of claim 16, wherein said electron-withdrawing group is a halogen atom.

23. The catalyst-initiator system of claim 22, wherein said electron-withdrawing group is a chlorine atom.

24. The catalyst-initiator system of claim 21, wherein said electron-withdrawing group is a halogen atom.

25. The catalyst-initiator system of claim 24, wherein said electron-withdrawing group is a chlorine atom.

26. The catalyst-initiator system of claim 16, wherein said Lewis acid and said Lewis base are complexed by dissolving the Lewis acid in solvent to form a solution, and then adding said Lewis base to said solution.

27. The catalyst-initiator system of claim 10, wherein the Lewis base has the structural formula of:

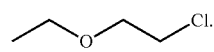

28. The catalyst-initiator system of claim 10, wherein the Lewis base has the structural formula of:

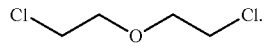

29. The catalyst-initiator system of claim 10, wherein the Lewis base has the structural formula of:

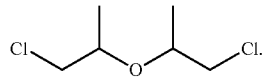

30. The catalyst-initiator system of claim 25, wherein the Lewis base has the structural formula of:

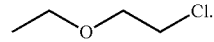

31. The catalyst-initiator system of claim 25, wherein the Lewis base has the structural formula of:

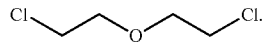

32. The catalyst-initiator system of claim 25, wherein the Lewis base has the structural formula of:

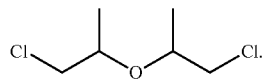

* * * * *